United States Patent [19]
Manss

[11] 3,790,220
[45] Feb. 5, 1974

[54] WHEEL FOR VEHICLE TIRES

[76] Inventor: August Manss, Ochshauser Strasse 11-25, Kassel-B, Germany

[22] Filed: May 7, 1970

[21] Appl. No.: 35,426

[30] Foreign Application Priority Data
May 13, 1969 Germany............................ 1924485

[52] U.S. Cl............ 301/63 D, 301/63 PW, 152/411
[51] Int. Cl............................................... B60b 5/02
[58] Field of Search ... 152/323, 327, 402, 403, 404, 152/405, 406, 407, 408, 411, 412; 301/63 D, 63 PW

[56] References Cited
UNITED STATES PATENTS

| | | | |
|---|---|---|---|
| 3,048,447 | 8/1962 | Klint | 301/63 PW |
| 2,606,076 | 8/1952 | Frazer | 152/403 X |
| 2,717,807 | 9/1955 | Kapp | 301/63 DS |
| 2,608,236 | 8/1952 | Hunt | 301/63 DS X |
| 3,695,728 | 10/1972 | Haussels | 301/63 PW |
| 2,720,240 | 10/1955 | Bourdon | 152/411 X |

FOREIGN PATENTS OR APPLICATIONS

| | | | |
|---|---|---|---|
| 440,685 | 10/1948 | Italy | 152/411 |
| 647,332 | 12/1950 | Great Britain | 152/411 |
| 1,032,821 | 4/1953 | France | 152/410 |

*Primary Examiner*—Richard J. Johnson
*Attorney, Agent, or Firm*—Michael S. Striker

[57] ABSTRACT

A wheel for vehicle tires comprising a hub of synthetic plastic material having opposite axial ends. In the region of one of these axial ends, a first flange of synthetic plastic material and being of one piece with the hub, projects radially from the latter. A second flange also consists of synthetic plastic material and projects radially from the hub in the region of the other axial end. The second flange is in form of a circumferentially almost complete ring the inner surface of which is provided with a circumferentially extending radially inwardly projecting rib. The ring is to be sprung onto the hub and the rib then becomes lodged in a circumferentially extending groove provided in the outer circumferential surface of the hub. The ring can thus be removed when desired.

1 Claim, 2 Drawing Figures

PATENTED FEB 5 1974  3,790,220

INVENTOR
AUGUST HAUSS
BY
ATTORNEY

WHEEL FOR VEHICLE TIRES

BACKGROUND OF THE INVENTION

The present invention relates to wheels, and more particularly to wheels for vehicle tires.

Wheels for vehicle tires are known in a great variety of different constructions. The invention is particularly concerned with those which are especially, although not exclusively, intended for use with vehicles utilizing small-dimensioned tires, such as transport carts, fork-lifts and the like. Conventionally, these wheels have a symmetrical cross section, meaning that a plane of symmetry passing through the wheel normal to the axis of the hub is a plane of symmetry not only for the wheel, but also for a tire provided on the wheel. To maintain the tires in place, the wheels have radially outwardly projecting flanges which are profiled in suitable manner to cooperate with the tire beads. Of course, this makes it necessary to provide the wheel in two parts because it is not possible to otherwise mount the tire thereon. Such wheels are frequently made of synthetic plastic material and then usually consist of two parts—although it is also possible to make them of more than two parts—which can be screw-threadedly connected with one another. They are thus inserted into the center opening of the tire from opposite sides and connected by screw threading.

These known constructions have certain disadvantages. On the one hand, the assembly of two or more parts requires additional work and therefore additional time resulting in an increase of the expenses involved. On the other hand, the screw threads—whether they are provided on the parts themselves or whether separate screws or bolts are used for the securing—are frequently exposed to the corrosive influence of moisture during the use of such wheels with the result that they quite often rust and make it difficult to separate the portions of the wheel when a tire has to be replaced because of wear or because of other damage.

SUMMARY OF THE INVENTION

It is, accordingly, a general object of the present invention to avoid the aforementioned disadvantages.

More particularly, it is an object of the present invention to provide a novel wheel for vehicle tires which is not possessed of these drawbacks.

A concomitant object of the invention is to provide such a wheel which can be manufactured readily and very economically and thus is less expensive than the previously known constructions of this type.

Still a further object of the invention is to provide such a construction wherein the need for separate means joining the constiuent components of the wheel—such as screws or bolts in the prior-art constructions—is eliminated.

In pursuance of the above objects, and others which will become apparent hereafter, one feature of the invention resides in a wheel for vehicle tires which, briefly stated, comprises a hub of synthetic plastic material having opposite axial ends. A first flange of synthetic plastic material projects radially from the hub in the region of one of the axial ends. A second flange also consists of synthetic plastic material and projects radially from the hub in the region of the other of the axial ends. According to the present invention, at least one of these flanges is connectable with and disconnectable from the hub with a snap action.

By resorting to my novel construction, there is obtained a wheel for vehicle tires which avoids the disadvantages of the prior art, which is simple and economical to construct, which can be readily assembled and disassembled when tires are mounted or de-mounted, respectively, and which requires no special connecting or fastening means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DECRIPTION OF THE DRAWING

FIG. 1 is a partially sectioned perspective view of a wheel according to the present invention; and FIG. 2 is a perspective view of a component of the wheel shown in FIG. 1.

DESCRIPTION OF THE PREFERRED EMBODIMENTS

Figure 1:
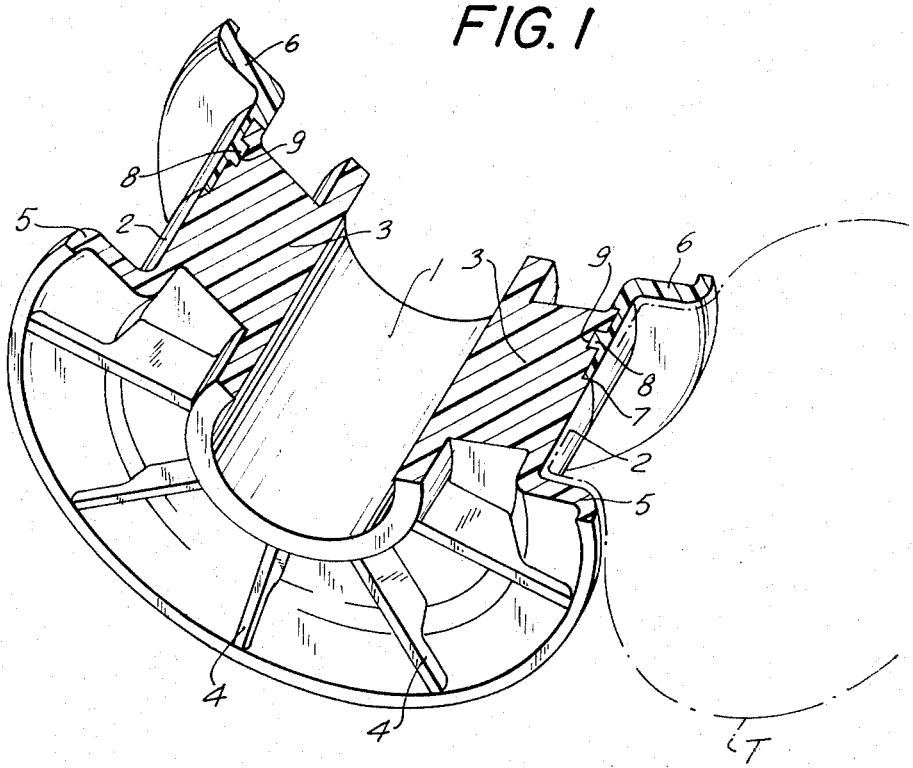

Discussing now the drawing in detail, it will be seen that the novel wheel illustrated therein consists of synthetic plastic material. Various types of such plastic materials are suitable for the purpose and are already well known to those skilled in the art, prior-art wheels of this type frequently being made of synthetic plastic material as pointed out above.

My novel wheel, which is advantageously made by injection molding in a suitable mold, has a relatively small diameter and comprises a hub 1, the outer circumferential surface 2 of which is the mounting surface of the tire T which is diagrammatically shown, and the wall portion 3. Adjacent one axial end of the hub, there projects a radial flange 5 which is of one piece with the hub or the wall portion 3 thereof, and which is made simultaneously with the hub and the wall portion 3. Reinforcing ribs 4 are provided as illustrated, and these are already known as conventional. The profiled configuration of the flange 5 is clearly evident and cooperates with the bead of the vehicle tire T.

Figure 2:
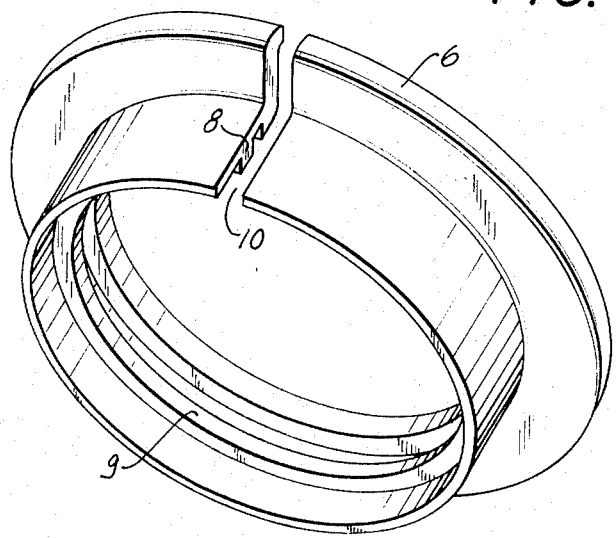

The other axial end of the hub 1, 3 is not provided with such flange as the one identified with reference numeral 5. Instead, the outer circumferential surface of the portion 3 is formed with a circumferentially extending groove 9 and a second flange 6 is provided which also consists of synthetic plastic material—preferably the same material as the remainder of the wheel—but which is a completely separate member. As FIG. 2 shows, the flange 6 is of circular outline and almost but not quite circumferentially complete. In other words, the flange 6 is in effect a ring formed with a radial slot. The purpose of the slot is to permit elastic radial deflecting of the flange 6 to make it possible to connect the latter with the hub 1,3. For this purpose, the inner circumferential surface of the flange 6, which latter is preferably provided with an axial tubular portion as illustrated, is provided with a circumferentially extending bead or rib 8. Further, the outer circumferential surface 2 is preferably provided with a recess the depth of which corresponds to the thickness of the tubular portion of the flange 6 but is less than the depth of the groove 9.

To connect the flange 6 with the hub 1,3, the flange is radially deflected in suitable manner and is then pushed onto the free end of the hub 1,3 until it abuts against the shoulder 7 provided at the juncture between the recess and the remainder of the surface 2. At such time, the rib 8 snaps into the groove 9 and the flange 6 is now securely connected with the hub 1,3. The cross sectional configuration, that is the profiling of the flange 6, corresponds to that of the flange 5. Flange 6 is maintained in the illustrated position of FIG. 1 by its own springiness and further by the tire T itself which exerts a certain amount of pressure in radially inward direction upon the tubular projection on the flange 6, thus preventing or aiding in prevention of separation.

To mount the tire T —which may be of the air-filled type but need not be of such type—the same is pushed onto the hub 1,3 from the end thereof opposite the flange 5. Thereupon the flange 6 is snapped onto the hub 1,3 in the manner just described. Conversely, if the tire T is to be de-mounted, the flange 6 is radially expanded by means of a suitable tool until the bead or rib 8 move out of the groove 9 so that the flange 6 can be axially withdrawn from the hub 1,3. Now, the tire T can also be removed.

It is of course possible to provide both of the flanges 5 and 6 in the releasable manner just discussed with reference to the flange 6 alone. It is also possible to make the flange 6 of more than one piece, for instance of two arcuately curved sections each of which snaps into the groove 9 with its associated rib 8.

As a material for my novel wheel, I have found synthetic plastic material not only suitable, but actually a requisite because the profiling, that is the particular cross section illustrated for the flange 6, would make other materials insufficiently capable of yielding radially for purposes of connecting or disconnecting the flange 6 with a snap action on the hub 1,3.

It will be understood that each of the elements described above, or two or more together, may also find a useful application in other types of constructions differing from the types described above.

While the invention has been illustrated and described as embodied in a wheel for vehicle tires, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A small-diameter wheel for transport carts and the like, comprising a hub composed of synthetic plastic material and having one axial end and an other axial end which is provided with an annular groove in an outer circumferential face of said hub axially inwardly of an end face of said other axial end; a first flange of synthetic plastic material of one piece with said hub and projecting radially from the same in the region of said one end; and an annular flange unit of synthetic plastic material provided with a tubular portion extending inwardly of said other end having an inner and an outer circumferential surface and a radial slot extending from one to the other thereof and which may widen in response to elastic yielding of said flange unit, said flange unit further including a second flange which is mirror-symmetrical relative to said first flange, an annular rib provided on said inner circumferential surface of said tubular portion of said flange unit and having a mating cross section complementary to that of said groove so as to be receivable in the latter with a snap action, and a radially inwardly extending shoulder on said inner circumferential surface axially spaced from said rib and abutting said end face when said rib is received in said groove.

* * * * *